Dec. 13, 1949  J. A. SALZMANN  2,491,136
MAXILLO-DENTAL MEASURING INSTRUMENT
Filed Oct. 6, 1945  3 Sheets-Sheet 1
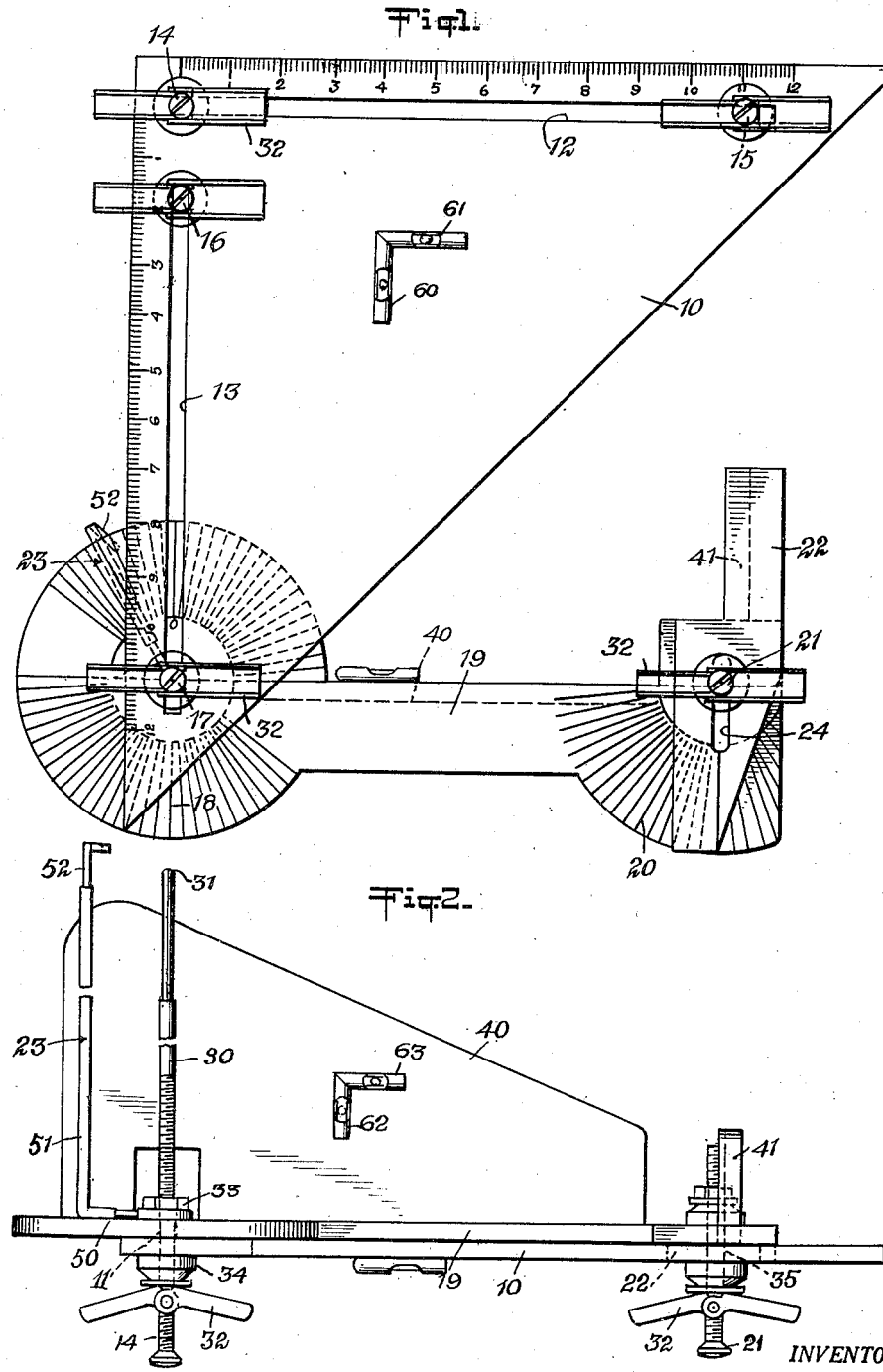
INVENTOR.
Jacob A. Salzmann Dec. 13, 1949 J. A. SALZMANN 2,491,136
MAXILLO-DENTAL MEASURING INSTRUMENT
Filed Oct. 6, 1945 3 Sheets-Sheet 2
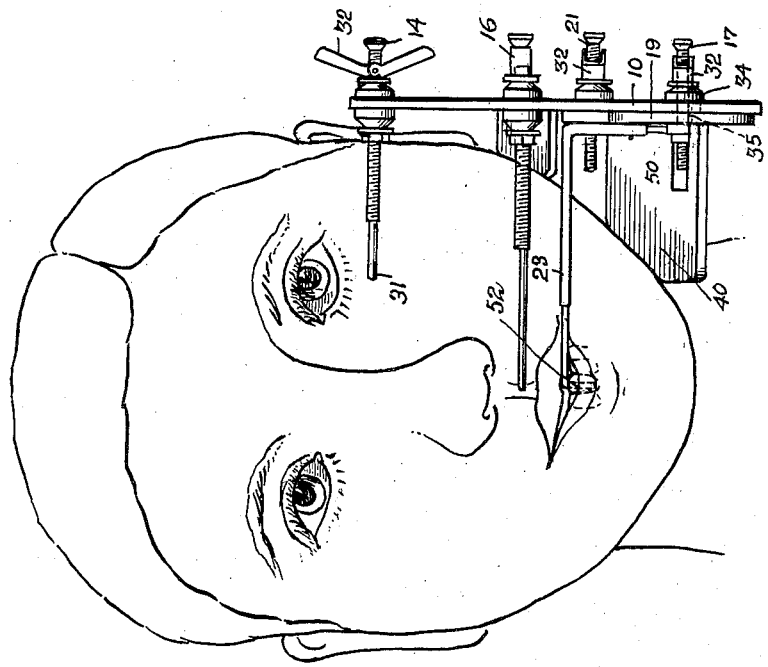
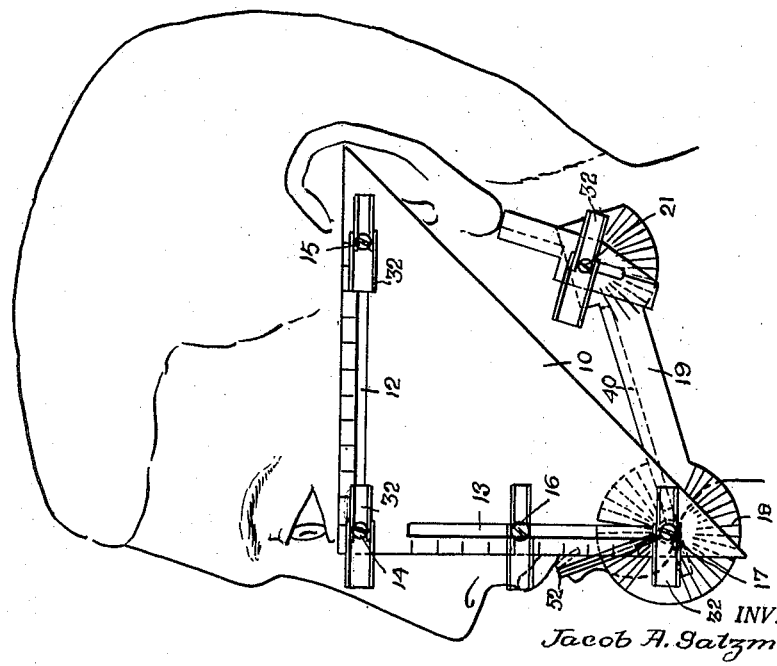
INVENTOR.
Jacob A. Salzmann
BY
Munn, Liddy & Glaccum
Attorneys

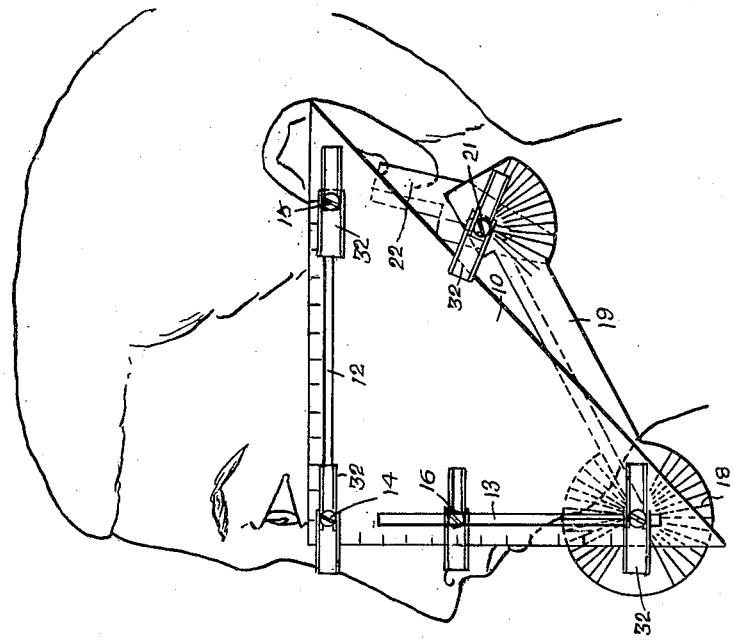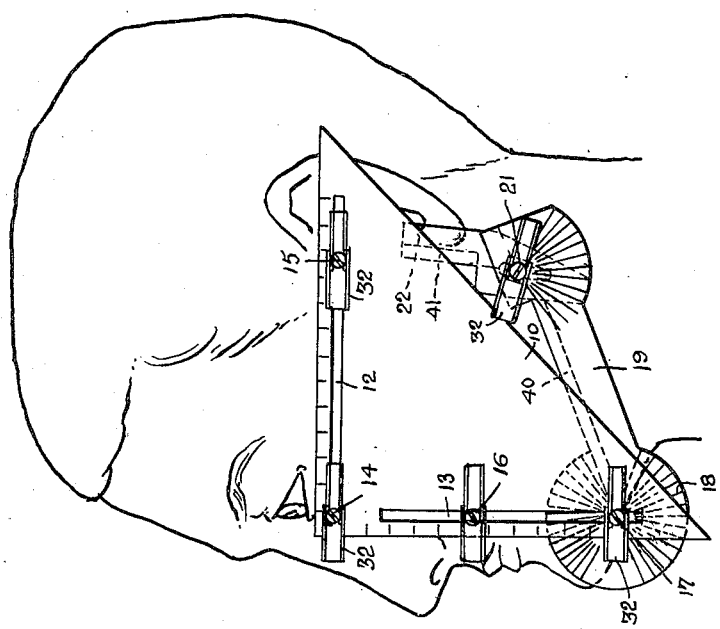

Patented Dec. 13, 1949

2,491,136

UNITED STATES PATENT OFFICE 2,491,136

MAXILLODENTAL MEASURING INSTRUMENT

Jacob A. Salzmann, Forest Hills, N. Y.

Application October 6, 1945, Serial No. 620,681

4 Claims. (Cl. 33—174)

The present invention relates to a maxillodental measuring instrument and, more particularly, to a device for taking precise maxillodental and, to a more limited extent, maxillofacial measurements. The device herein claimed may be used to measure anatomical features and relationships in orthodontia, dental prosthesis and maxillofacial prosthesis. This device renders it unnecessary to employ casts of the face and jaws, X-rays, photographs, facial tracings, head positioning apparatus and other time consuming methods and costly equipment now employed in taking measurements in the fields above mentioned, as well as in such other fields as plastic surgery, physical anthropology, comparative dental anatomy and statistical studies of the growth, development and change of the face and jaws. The device herein claimed may also be used for obtaining data useful in identification of faces, skulls and their component parts.

The principal object of the invention, therefore, is the provision of a measuring instrument of the character described by which all of the measurements hereinabove referred to may be taken with great ease and accuracy.

Another object of the invention is the provision of a device of this character which may be made of simple, inexpensive construction to sell at a relatively low price to insure the widest possible use thereof in the fields above noted.

A preferred embodiment of the invention is shown in the accompanying drawing in which—

Fig. 1 is a face view of the device;

Fig. 2 is a top view thereof;

Fig. 3 is a face view of the device similar to that of Fig. 1 showing how it is used in taking certain measurements hereinafter described;

Fig. 4 is a front view of said device taken at right angles to the view shown in Fig. 3;

Fig. 5 is a view similar to that of Fig. 3 showing how the device is used in connection with a face having mandibular protraction; and Fig. 6 is a similar view showing the use of the device on a face having maxillary protraction and mandibular retraction.

Referring now to the drawing and, more particularly, to Figs. 1 and 2 thereof, it will be seen that the device herein claimed comprises the following elements: A graduated square 10 having an aperture 11 at a point adjacent the apex thereof midway between the two sides thereof, and also having a horizontal slot 12 and a vertical slot 13 whose axes intersect, respectively, the axis of the aperture 11, an indicator 14 mounted in the aperture 11, a second indicator 15 slidably mounted in the horizontal slot 12, a third indicator 16 slidably mounted in the vertical slot 13, a fourth indicator 17 also slidably mounted in slot 13 below indicator 16, a protractor 18 centrally mounted on indicator 17, a radial arm 19 affixed to said protractor, a second protractor 20 at the free end of radial arm 19, a fifth indicator 21 mounted centrally of said second protractor 20, a second radial arm 22 provided with a slot 24 by which it is mounted on the fifth indicator 21 centrally of the second protractor 20 for pivotal and slidable movement relative to said second protractor, and a third radial arm 23 mounted on said fourth indicator 17.

It will be noted that the square 10, which takes the preferred form of a right angle triangle, is graduated on its horizontal and vertical sides. The metric system has been followed in the preferred embodiment and has been found to be eminently suitable for the purposes indicated.

The indicators 14, 15, 16, 17 and 21 above referred to are all of substantially the same construction and each comprises the following component parts: A screw 30 having a reduced end 31, a quick adjusting wing clamp 32, a nut 33 and a pair of washers 34 between said clamp and said nut. Washers 34 are disposed one on each side of square 10. In the case of the indicator 14, the screw 30 is carried within the aperture 11. In the case of the indicator 15, the screw 30 is slidably mounted in horizontal slot 12. In the case of indicators 16 and 17, the screws 30 are slidably mounted in vertical slot 13 and in the case of indicator 21, the screw 30 is mounted in a hole 35 in the center of the protractor 20.

It will be noted in Fig. 2 that a fin 40 of substantially triangular shape is affixed to the side of the radial arm 19, said fin extending substantially across the major part of the protractor 18. The object of this fin will shortly become apparent. It is sufficient, however, to say here that the second radial arm 22 is provided with a corresponding fin 41 which is affixed to the side of said second radial arm on a plane which is intersected by the plane of fin 40 at right angles.

The third radial arm 23 comprises the following component parts: An arm 50 which is pivotally mounted on the screw 30 of the indicator 17, an L-shaped member 51 which is telescopically engaged at one of its ends with said arm 50 and which is telescopically engaged at its other end with a second L-shaped member 52. In the preferred embodiment of this invention, the L-shaped member 51 is a hollow tube having a curved and a flat side, and arm 50 and second L-shaped member 52 constitute half-round wires whose dimensions and shape correspond to the inner dimensions and shape of the tubular L-shaped member 51. It will be understood that members 50 and 52 are adapted to engage in axial movement only with respect to said tubular L-shaped member 51. The entire assembly, to wit, members 50, 51 and 52 which together constitute the third radial arm 23, is movable pivotally with respect to the screw 30 of the indicator 17.

Upon consideration of the foregoing, it will be understood that when the device is held in the position shown in Fig. 1, the indicators 14 and 15 may be used to measure horizontal distances and the indicators 14 and 16 or 14 and 17 may be used to measure vertical distances. The first radial arm 19 is pivotally mounted with respect to the vertical side and slot of the square 10. Since the vertical side and slot are in fixed relationship with the horizontal side and slot, there will be a definite correspondence between the angle formed between the radial arm 19 and the vertical slot and side, and the angle formed between the radial arm 19 and the horizontal slot and side. Such being the case, the protractor 18 to which said radial arm 19 is affixed will measure not only the angle between said radial arm and the vertical slot and side but also the angle between said radial arm and the horizontal slot and side. It will also be understood from the foregoing that the protractor 20 will measure the angle between the second radial arm 22 and the first radial arm 19 and that a definite geometrical relationship may be set up at any particular time between the longitudinal axis of the second radial arm 22 and the horizontal slot and side or between said longitudinal axis of the radial arm 22 and the vertical slot and side.

The device hereinabove described may be used as follows, reference being made especially to Figs. 3 and 6, inclusive: To measure the length of the Frankfort plane on a straight line, the indicator 14 is placed at the orbital point and the indicator 15 at the tragion point. The latter indicator 15 is now clamped to the square 10 and a reading taken on the horizontal side of said square. To measure the length of the face on a straight line from the orbital point to the lower edge of the mandible, the indicator 14 is placed at the orbital point and the indicator 16 or the indicator 17 is placed at a point opposite the lower edge of the mandible. A reading is now taken on the vertical side of the square 10. To ascertain the mesiodistal relation of the maxillary dental arch to the orbital plane, place the indicator 14 at the orbital point, indicator 15 at the tragion point and indicator 16 at the incisal edge of the maxillary tooth which lies opposite indicator 16. To ascertain the relationship of the mandibular teeth to the orbital plane, follow the procedure last above described but place the indicator 16 or the indicator 17 at the incisal edge of the mandibular tooth which lies opposite said indicator. To measure the Frankfort-mandibular base angle, the measuring device herein described is applied to the face of the patient in substantially the same manner and position as is shown in Figs. 3 and 4. The indicators 14 and 15 are placed, as aforesaid, at the orbital and tragion points, respectively. The fin 40 is placed well under the mandible and is pressed against the lower edge or border thereof. The fin 40 thus describes the mandibular base plane, i. e. the plane tangent to the most dependent points of the lower border of the mandible. The size of the Frankfort mandibular base angle which is the angle formed between the Frankfort plane and the mandibular base plane is thus shown on the protractor 18.

With particular reference to Fig. 5 the adjustment is made by holding the square against the face with the left hand. Screw 14 is adjusted at the infra-orbital point and screw 15 is adjusted at the tragion point. Radial arm 19 is placed under the base of the jaw and adjacent to the lower border of the mandible. The reading of the angle between the Frankfort plane which is measured from the infra-orbital point to the tragion point as indicated above and the line tangent to the base of the jaw is then read on protractor 18.

Fig. 6 shows the second radial arm 22 measuring the Gonion angle formed by a line tangent to the vertical extension of the jaw or ramus and the base of the mandible. The reading is taken on protractor 20.

To obtain the Gonion angle, the fin 41 of the second radial arm 22 is placed in back of the ramus and said fin thereby becomes what may here be known as the ramus piece, and the fin 40 which may herein be known as the mandibular base piece is placed against the lower border of the mandible as described above. A reading on the protractor 20 will now give the Gonion angle.

To obtain the incisor-mandibular plane angle, place the mandibular base piece or fin 40 against the base of the mandible as above described. Adjust the third radial arm 23 so that the free end of the L-shaped wire 52 lies against the lingual surface of the mandibular central incisor, right or left, whichever is more typical of the inclination of the other mandibular incisors. A reading of the protractor 18, the radial member 50 serving as the indicating arm with respect thereto, will give the incisor-mandibular plane angle.

It will be understood that what has been above described is but a preferred embodiment of the invention. Different types of indicating members and clamping means may be used in place of those shown in the drawing and herein described. The material of which the different parts are made may be varied to suit different purposes and conditions. It has been found, for example, that the plastic material sold under the trade mark "Plexiglas" is a highly desirable material from which the square, protractors and radial arms 19 and 22 may be made. It will be understood, too, that the device herein described may be mounted on a stand for greater ease in applying and using the same or conventional head clamps may be used to hold the device in place. When using a conventional head clamp, two devices may simultaneously be used—one on each side of the face. To render the device even more precise, a pair of vertical and horizontal levels 60 and 61, respectively, may be mounted on the square 10 and a similar pair of levels 62 and 63 may be mounted on the fin or mandibular base piece 40.

I claim:

1. A maxillodental measuring device comprising a graduated square, indicators on said square movable parallel to the sides thereof for measuring linear distances on lines which are perpendicular to each other, a protractor on said square movable parallel to one of the sides thereof, a radial arm fixed to said protractor and a second radial arm pivoted to said protractor, the angle between the two arms and the angle between said arms and the sides of the square being measurable by said protractor, said first arm being provided at its free end with a second protractor and a third radial arm pivotally and slidably mounted with respect to said first arm, the angle between said first and third arms being measurable by said second protractor, said first radial arm being provided with a substantially triangular fin affixed at right angles thereto, said fin being adapted for positioning along the base of the mandible.

2. A maxillodental measuring device comprising a graduated square, indicators on said square movable parallel to the sides thereof for measuring linear distances on lines which are perpendicular to each other, a protractor on said square movable parallel to one of the sides thereof, a radial arm fixed to said protractor and a second radial arm pivoted to said protractor, the angle between the two arms and the angle between said arms and the sides of the square being measurable by said protractor, said first arm being provided at its free end with a second protractor and a third radial arm pivotally and slidably mounted with respect to said first arm, the angle between said first and third arms being measurable by said second protractor, said third radial arm being provided with a substantially triangular fin affixed at right angles thereto, said fin being adapted for positioning along the ramus.

3. A maxillodental measuring device comprising a graduated square, indicators movable parallel to the horizontal side of said square, one of said indicators being adjustable at the infraorbital point on the human face and the second of said indicators being adjustable at the tragion point, an indicator movable parallel to the vertical side of said square, said latter indicator being adjustable at the base of the mandible, an arm pivoted at one end to the lower end of the vertical side of the square, a protractor for measuring the angle between the vertical side of the square and said arm, said arm being positionable along the base of the mandible, a second arm being pivotally and slidably mounted at the free end of the first arm and being positionable along the ramus, a protractor for determining the angle between said first and second arms, a third arm pivotally mounted on a common axis with the pivot of the first arm, said third arm being positioned to engage the lingual surface of the mandibular central incisor, and a protractor for determining the angle between said first and third arms.

4. A measuring device in accordance with claim 3 in which the indicators and the arms are provided with horizontally extending projections which are substantially perpendicular to the side of the square and to the sides of said arms, said projections being of a length sufficient to reach those parts of the face which lie opposite them.

JACOB A. SALZMANN.

REFERENCES CITED

The following references are of record in the file of this patent:

UNITED STATES PATENTS

| Number | Name | Date |
|---|---|---|
| 1,050,969 | McLeod | Jan. 21, 1913 |
| 1,378,745 | Wavrin | May 17, 1921 |
| 1,661,096 | Rowe | Feb. 28, 1928 |
| 2,043,230 | Boll et al. | June 9, 1936 |
| 2,095,059 | Donnelly | Oct. 5, 1937 |

FOREIGN PATENTS

| Number | Country | Date |
|---|---|---|
| 9,585 | Great Britain | A. D. 1896 |
| 427,610 | Germany | Apr. 16, 1926 |
| 657,389 | Germany | Mar. 3, 1938 |